United States Patent
Nguyen et al.

(10) Patent No.: US 10,885,143 B2
(45) Date of Patent: *Jan. 5, 2021

(54) DETERMINING WHETHER AN AUTHENTICATED USER SESSION IS ACTIVE FOR A DOMAIN

(71) Applicant: Capital One Services, LLC, McLean, VA (US)

(72) Inventors: Vu Nguyen, McLean, VA (US); Joshua Edwards, McLean, VA (US); Adam Vukich, McLean, VA (US); Mykhaylo Bulgakov, McLean, VA (US); Abdelkadar M'Hamed Benkreira, McLean, VA (US); David Gabriele, McLean, VA (US); Andrea Montealegre, McLean, VA (US); Ljubica Chatman, McLean, VA (US); Jonatan Yucra Rodriguez, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,758

(22) Filed: Oct. 18, 2019

(65) Prior Publication Data
US 2020/0272680 A1    Aug. 27, 2020

Related U.S. Application Data

(63) Continuation of application No. 16/281,845, filed on Feb. 21, 2019, now Pat. No. 10,452,736.

(51) Int. Cl.
*H04L 29/06* (2006.01)
*G06F 16/955* (2019.01)
(Continued)

(52) U.S. Cl.
CPC ........ *G06F 16/9566* (2019.01); *G06F 16/951* (2019.01); *G06F 16/9532* (2019.01);
(Continued)

(58) Field of Classification Search
CPC ... G06F 21/31; G06F 16/951; H04L 63/1433; H04L 63/1483
See application file for complete search history.

(56) References Cited

U.S. PATENT DOCUMENTS 6,851,060 B1    2/2005  Shrader
10,452,736 B1 * 10/2019  Nguyen ................ G06F 21/31
(Continued)

OTHER PUBLICATIONS

Burke I., et al., "Who Needs a Botnet if you Have Google?", The Proceedings of the 6th International Conference on Information Warfare and Security, 2011, pp. 32-41.
(Continued)

*Primary Examiner* — Thaddeus J Plecha
(74) *Attorney, Agent, or Firm* — Harrity & Harrity, LLP

(57) ABSTRACT

In some implementations, a device may detect loading of a first web page associated with a domain, and may create an inline frame element that references a second web page associated with the domain. The second web page may require an authenticated user session to access particular content of the second web page. The device may insert the inline frame element into code for the first web page, and may transmit a request for the second web page based on inserting the inline frame element into the code for the first web page. The device may receive a response to the request for the second web page, and may determine whether there is an authenticated user session for the domain based on the response. The device may selectively perform an action based on determining whether there is an authenticated user session for the domain.

20 Claims, 6 Drawing Sheets

(51) Int. Cl.
  *G06F 16/9532* (2019.01)
  *G06F 16/957* (2019.01)
  *G06F 21/31* (2013.01)
  *G06F 16/951* (2019.01)

(52) U.S. Cl.
  CPC .......... *G06F 16/9577* (2019.01); *G06F 21/31* (2013.01); *H04L 63/0876* (2013.01); *H04L 63/1433* (2013.01); *H04L 63/1483* (2013.01)

(56) References Cited

U.S. PATENT DOCUMENTS

| | | | |
|---|---|---|---|
| 2010/0100958 A1* | 4/2010 | Jeremiah | G06F 21/36 726/22 |
| 2011/0264736 A1 | 10/2011 | Zuckerberg et al. | |
| 2011/0321133 A1 | 12/2011 | Grieve | |
| 2012/0054596 A1 | 3/2012 | Kroger et al. | |
| 2012/0110469 A1 | 5/2012 | Magarshak | |
| 2015/0200963 A1* | 7/2015 | Geng | G06F 21/51 726/22 |
| 2016/0323309 A1 | 11/2016 | Sethi et al. | |
| 2019/0050849 A1 | 2/2019 | Yoo | |

OTHER PUBLICATIONS

Grossman J., "I Know What Websites You Are Logged-in to (Login-Detection via detection via CSRF)," Oct. 10, 2012, 14 pages. Retrieved from Internet:[URL:https://www.whitehatsec.com/blog/i-know-what-websites-you-are-logged-in-to-login-detection-via-csrf/].

"Iframe in Backend: Check If Backend User Is Logged in", Magenta Stack Exchange, 2014, 3 pages.

Stackoverflow, "Javascript: Add iframe Element After Page Has Loaded," Dec. 30, 2010, 5 pages. Retrieved from Internet:[URL:https://stackoverflow.com/questions/3069915/javascript-add-iframe-element-after-page-has-loaded].

* cited by examiner

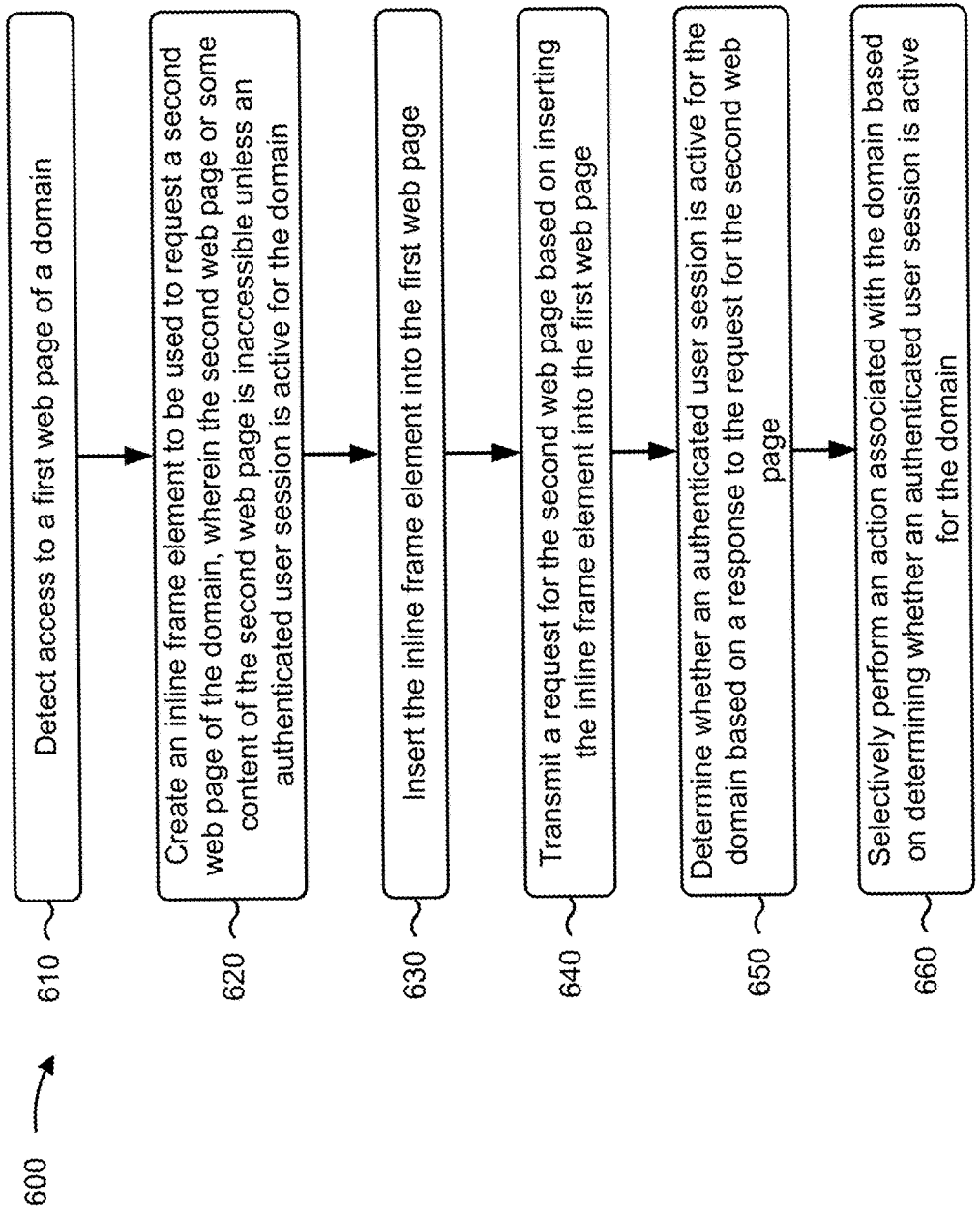

DETERMINING WHETHER AN AUTHENTICATED USER SESSION IS ACTIVE FOR A DOMAIN

RELATED APPLICATION

This application is a continuation of U.S. patent application Ser. No. 16/281,845, filed Feb. 21, 2019 (now U.S. Pat. No. 10,452,736), the content of which is incorporated by reference herein in its entirety.

BACKGROUND

User authentication is the verification of a user using credentials required for confirmation of the user's authenticity. User authentication is performed in many human-to-computer interactions. User authentication may be performed to enable access to a network, to enable access to a web page or web resources (e.g., on the Internet), and/or the like. Traditionally, user authentication has typically consisted of a user identifier (e.g., a user name) and a password.

SUMMARY

In some implementations, a method may include detecting, by a device, navigation to a first web page of a domain. The method may include creating, by the device, an inline frame element that includes a uniform resource locator (URL) that points to a second web page of the domain. The second web page may include different content depending on whether there is an authenticated user session for the domain. The method may include inserting, by the device, the inline frame element into the first web page. The method may include requesting, by the device, the second web page based on inserting the inline frame element into the first web page. The method may include determining, by the device, whether there is an authenticated user session for the domain based on a response received in connection with requesting the second web page. The method may include performing, by the device, an action associated with the domain based on determining whether there is an authenticated user session for the domain.

In some implementations, a device may include a memory and one or more processors communicatively coupled to the memory. The one or more processors may be configured to detect loading of a first web page associated with a domain, and to create an inline frame element that references a second web page associated with the domain. The second web page may require an authenticated user session to access particular content of the second web page. The one or more processors may be configured to insert the inline frame element into code for the first web page, and to transmit a request for the second web page based on inserting the inline frame element into the code for the first web page. The one or more processors may be configured to receive a response to the request for the second web page, and to determine whether there is an authenticated user session for the domain based on the response. The one or more processors may be configured to selectively perform an action based on determining whether there is an authenticated user session for the domain.

In some implementations, a non-transitory computer-readable medium may store one or more instructions that, when executed by one or more processors, cause the one or more processors to detect access to a first web page of a domain, and to create an inline frame element to be used to request a second web page of the domain. The second web page or some content of the second web page may be inaccessible unless an authenticated user session is active for the domain. The one or more instructions, when executed by one or more processors, may cause the one or more processors to insert the inline frame element into the first web page, and to transmit a request for the second web page based on inserting the inline frame element into the first web page. The one or more instructions, when executed by one or more processors, may cause the one or more processors to determine whether an authenticated user session is active for the domain based on a response to the request for the second web page, and selectively perform an action associated with the domain based on determining whether an authenticated user session is active for the domain.

BRIEF DESCRIPTION OF THE DRAWINGS

FIGS. 4-6 are flow charts of example processes for determining whether an authenticated user session is active for a domain.

DETAILED DESCRIPTION

Figure 1:
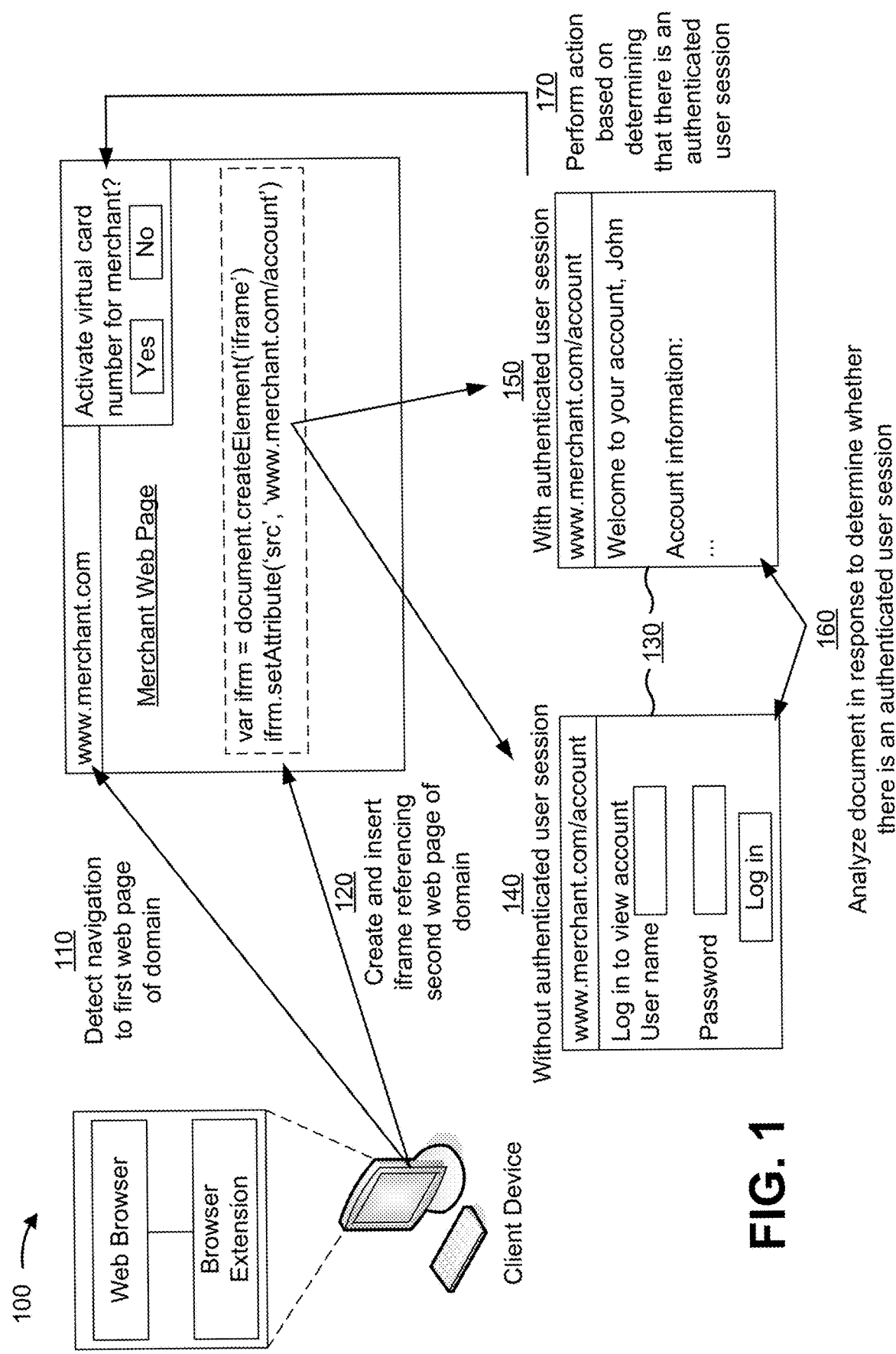
FIG. 1 is a diagram of an example implementation described herein.

The following detailed description of example implementations refers to the accompanying drawings. The same reference numbers in different drawings may identify the same or similar elements.

A browser extension is a plug-in application that enhances functionality of a web browser. In some cases, a browser extension may execute a script (e.g., code, which may be written in a scripting language, such as JavaScript and/or the like) to perform an operation in association with the web browser, a web page accessed by and/or rendered by the web browser, and/or the like. Some scripts may be executed based on user input (e.g., clicking a button or otherwise interacting with a user input component), and some scripts may be automatically executed (e.g., based on a determination that one or more conditions are satisfied). Some scripts may interact with sensitive web pages that require an authentication user session (e.g., that requires a user to log in) before the web page and/or particular content of the web page can be accessed and/or rendered in the web browser. When such a script is executed, the script may not operate as intended or may generate an error if an authenticated user session is not active for the web page or a domain of the web page (e.g., if the user is not logged in or has not recently input user credentials to establish an authenticated user session).

When a script interacts with a web page that requires an authenticated user session, and such a session is not active, this may result in errors, failed execution of the script, a poor user experience, and/or the like. Furthermore, this may result in the need to execute the script multiple times (e.g., once before the authenticated user session is established and once after the authenticated user session is established), which may waste network resources (e.g., due to multiple network calls, multiple requests, multiple responses, and/or the like), may waste resources of a client device that executes the script (e.g., processing resources and/or memory resources used during script execution, battery power consumed during script execution, and/or the like), may waste resources of a web server that interacts with the client device as a result of executing the script (e.g., processing resources and/or memory resources used to respond to a request generated by the script, communication resources used to respond to the request, and/or the like), and/or the like.

Some techniques and apparatuses described herein are capable of determining whether an authenticated user session is active before executing a script in a web browser. This may reduce errors in script execution and may lead to a better user experience when the script requires an authenticated user session for a web page and/or domain in order for the script to properly execute. Furthermore, this may reduce the number of times that the script executes, thereby conserving network resources, resources of a client device that executes the script, resources of a web server that interacts with the client device as a result of script execution, and/or the like.

FIG. 1 is a diagram of an example implementation 100 described herein.

As shown in FIG. 1, a client device (e.g., a computer, a mobile phone, a tablet, and/or the like) may run a web browser and a browser extension for the web browser. As shown by reference number 110, the client device (e.g., using the browser extension) may detect navigation to a first web page of a domain (e.g., navigation to the web page, access to the web page, loading and/or rendering of the web page by the web browser, and/or the like). In FIG. 1, the domain is shown as "merchant" in "www.merchant.com" as an example. In other examples, the domain may be a sub-domain, such as "shop" in "shop.merchant.com."

As shown by reference number 120, the client device (e.g., using the browser extension) may create an inline frame element (an "iframe") that references a second web page of the domain, and may insert the iframe into the first web page (e.g., into code of the first web page, such as hypertext markup language (HTML) code and/or the like). The client device may execute code included in the iframe. For example, the iframe may include a uniform resource locator (URL) that points to the second web page, shown as "www.merchant.com/account" in FIG. 1. The client device may execute the code in the iframe to request access to and/or resources of the second web page (e.g., "www.merchant.com/account"). In some implementations, the second web page may be different from the first web page (e.g., may have a different sub-domain, may have a different path, may have different query parameters, may be referenced by a different URL, and/or the like), but may have the same domain as the first web page (e.g., "merchant" in FIG. 1).

In some implementations, the iframe may be a hidden iframe. For example, the client device may create the iframe as a hidden iframe (e.g., with a "hidden" attribute activated). As a result, the iframe may not be displayed by the browser when the iframe is inserted into the code of the first web page. In this way, the iframe may not interrupt a user experience or cause a poor user experience.

In some implementations, the client device may create the iframe based on a determination that the domain satisfies one or more conditions. For example, a script to be executed if there is an authenticated user session may only be applicable to some domains (e.g., domains via which a transaction can occur, such as a purchase, an order, and/or the like). In this case, the client device may store a list of domains for which the script is valid, and may create the iframe if the domain of the first web page is included in the list. If the domain of the first web page is not included in the list, then the client device may not create the iframe, thereby conserving resources (e.g., network resources, client device resources, web server resources, and/or the like).

In some implementations, when the client device transmits a request (e.g., a hypertext transfer protocol (HTTP) request) for the second web page to a web server, the web server may return a response (e.g., an HTTP response) that includes code to deny rendering of the second web page in the inline frame element. For example, the response may include an X-Frame-Options header (e.g., an HTTP response header that includes code for X-Frame-Options). Such a header may be used to indicate whether a web browser should be allowed to render a page in a frame, in an iframe, in a hidden iframe, and/or the like. If the header indicates that the web browser is not allowed to render the second web page in an iframe, then the client device (e.g., using the browser extension) may modify the header (e.g., the code in the header) to permit the web browser to render the second web page in an iframe. For example, the client device may remove or alter the X-Frame-Options code. In this way, the second web page may be rendered in the iframe after the code is modified.

In some implementations, one or more responses received from the web server (e.g., based on the request for the second web page) may be modified to permit rendering of the second web page in the iframe until the client device determines whether there is an authenticated user session, as described in more detail below. Additionally, or alternatively, one or more responses received from the web server may be modified to permit rendering of the second web page in the iframe until the second web page is rendered. After the client device determines whether there is an authenticated user session and/or after the client device renders the second web page (e.g., using the web browser), then the client device may refrain from modifying future responses, so that pages in the future responses are not permitted to be rendered in an iframe. In this way, the client device may increase security.

As shown by reference number 130, the second web page may include different content depending on whether there is an authenticated user session for the domain (e.g., depending on whether the user recently logged in, recently input credentials, is automatically logged in, and/or the like). For example, the second web page may require an authenticated user session in order to access particular content of the second web page (e.g., sensitive information). Additionally, or alternatively, the second web page and/or some content of the second web page may be inaccessible unless an authenticated user session is active for the domain. Thus, when the client device transmits, to a web server, a request for the second web page, the web server may return, in a response to the request, a different page depending on whether there is an authenticated user session, different content for the second web page depending on whether there is an authenticated user session, and/or the like For example, as shown by reference number 140, when there is not an authenticated user session for the "merchant" domain of "www.merchant.com," a response to a request to access the second web page (e.g., based on inserting the iframe into the first web page and executing the code included in the iframe) may include a prompt for a user to input user credentials (e.g., a user name, a password, and/or the like) to log in to the domain. In FIG. 1, the content of the second web page when there is not an authenticated user session includes a text element of "Log in to view account," a text element of "Username," a text element of "Password," two text box elements for user input of the user name and password, and a button element with a text attribute of "Log in." Additionally, or alternatively, the content of the second web page may include various other content and/or elements in the code to define a layout of the page, a style of the page, input mechanisms of the page, and/or the like.

As shown by reference number 150, when there is an authenticated user session for the "merchant" domain of "www.merchant.com," a response to a request to access the second web page may include account information for the user. In FIG. 1, the content of the second web page when there is an authenticated user session includes a text element of "Welcome to your account, John," a text element of "Account information," and various other content to display the account information of the user. Thus, the content of the second web page is different depending on whether there is an authenticated user session for the domain. For example, the page may include different text, a different amount of text (e.g., a different word count, character count), different code, a different amount of code (e.g., a different number of lines of code, a different number of characters in the code), different elements (e.g., different code elements, different HTML elements, different extensible markup language (XML) elements, and/or the like), different attributes (e.g., different code attributes, different HTML attributes, different XML attributes), different types of elements, different document object model (DOM) representations, different tags (e.g., code tags, HTML tags, XML tags), and/or the like.

In other words, the web server may return a first document for the second web page when there is an authenticated user session, and may return a second (different) document for the second web page when there is not an authenticated user session. Additionally, or alternatively, the web server may return a different web page when there is not an authenticated user session (e.g., "www.merchant.com/login") as compared to a web page returned when there is an authenticated user session (e.g., "www.merchant.com/account").

As shown by reference number 160, the client device (e.g., using the browser extension) may determine whether there is an authenticated user session for the domain based on a response received in connection with requesting the second web page. For example, the client device may analyze a document returned by the web server, in a response to the request to access the second web page, to determine whether there is an authenticated user session for the domain. In some implementations, the client device may determine whether there is an authenticated user session based on a determination of whether the document satisfies a condition. For example, if the document satisfies the condition, then the client device may determine that there is an authenticated user session, and if the document does not satisfy the condition, then the client device may determine that there is not an authenticated user session.

For example, the client device may store information that identifies content expected to be included in the returned document when there is an authenticated user session and/or content expected to be included in the returned document when there is not an authenticated user session. The client device may search the document (e.g., by performing a query, such as an HTML query, an XPath query, and/or the like) for the content to determine whether there is an authenticated user session. Additionally, or alternatively, the client device may store information that identifies an expected query response when there is an authenticated user session and/or an expected query response when there is not an authenticated user session, and the client device may compare an actual query response to the expected query response to determine whether there is an authenticated user session.

For example, the client device may search for specific text (and/or a specific combination of text) included in the returned document, specific code (and/or a specific combination of code) included in the returned document, a specific element (and/or a specific combination of elements) included in the returned document, a specific type of element (and/or a specific combination of element types) included in the returned document, a specific attribute (and/or a specific combination of attributes) identified in the returned document, a specific tag (and/or a specific combination of tags) included in the returned document, and/or the like. Additionally, or alternatively, the client device may determine an amount of text, an amount of code, and/or the like included in the returned document, may determine a proximity between different elements, may determine a DOM representation and/or a structure of the DOM representation generated from the returned document, and/or the like. The client device may use the results of one or more of these searches and/or determinations to determine whether there is an authenticated user session.

As an example, and referring to FIG. 1, the client device may search the returned document for the text "Log in." Additionally, or alternatively, the client device may search the returned document for the text "User name" and/or "Password." In either case, if such text is present, then the client device may determine that there is not an authenticated user session. If such text is absent, then the client device may determine that there is an authenticated user session. Additionally, or alternatively, the client device may search the returned document for a specific element and/or combination of elements, such as a text box with a "User name" attribute, a text box with a "Password" attribute, a button with the text "Log in," and/or the like. If such element(s) are present, then the client device may determine that there is not an authenticated user session. If such element(s) are absent, then the client device may determine that there is an authenticated user session. These are only a few examples, and various implementations may use different examples (e.g., using the content described above, or other content).

In some implementations, when transmitting a request for the second web page, the client device (e.g., using the browser extension) may indicate a user agent in the request, such as a user agent for the inline frame element. In some implementations, the user agent for the inline frame element may be different from a user agent that would otherwise be included in a request from the web browser (e.g., if the browser extension were not running). In some implementations, the browser extension may indicate the same user agent for the inline frame element for different requests associated with different web browsers, different operating systems, different devices (e.g., a computer vs. a mobile phone), and/or the like.

When responding to a request, a web server may provide a different document (e.g., different content, different formatting of the content, and/or the like) for different user agents indicated in the request. For example, a user agent indicating a mobile phone may cause the web server to return a mobile version of a web page (e.g., a first document), and a user agent indicating a desktop computer may cause the web server to return a desktop version of the web page (e.g., a second document). By indicating the same user agent across different web browsers, different operating systems, different types of devices, and/or the like, the browser extension can control the document returned by the web server. This may ensure a more consistent result when determining whether the document satisfies a condition. For example, a desktop version of a web page may satisfy a condition, and a mobile version of the web page may not satisfy the condition. Thus, by controlling the document returned by the web server, the browser extension can reduce errors in determining whether there is an authenticated user session.

As shown by reference number 170, the client device (e.g., using the browser extension) may selectively perform an action based on determining whether there is an authenticated user session. In some implementations, if the client device determines that there is an authenticated user session, then the client device may perform the action, and if the client device determines that there is not an authenticated user session, then the client device may refrain from performing the action. Additionally, or alternatively, the client device may perform an action if there is an authenticated user session, and may perform a different action if there is not an authenticated user session.

In some implementations, the action performed by the client device when there is an authenticated user session may include executing a script (e.g., code). As shown in FIG. 1, execution of an script causes the web browser and/or the browser extension to output a request for user input regarding whether a second action is to be performed (e.g., via execution of another script). In some implementations, the second action may require an authenticated user session in order for the second action to be performed. For example, the second action may include generating a virtual card number to be used for a transaction associated with the domain, as shown. The second action may include other actions, such as modifying user account information, modifying user payment information, and/or the like. By determining whether there is an authenticated user session prior to executing the second action, the client device may enhance a user experience, reduce errors, conserve network resources, conserve resources of the client device, conserve resources of a web server, and/or the like, as described elsewhere herein.

As indicated above, FIG. 1 is provided as an example. Other examples may differ from what is described with regard to FIG. 1.

Figure 2:
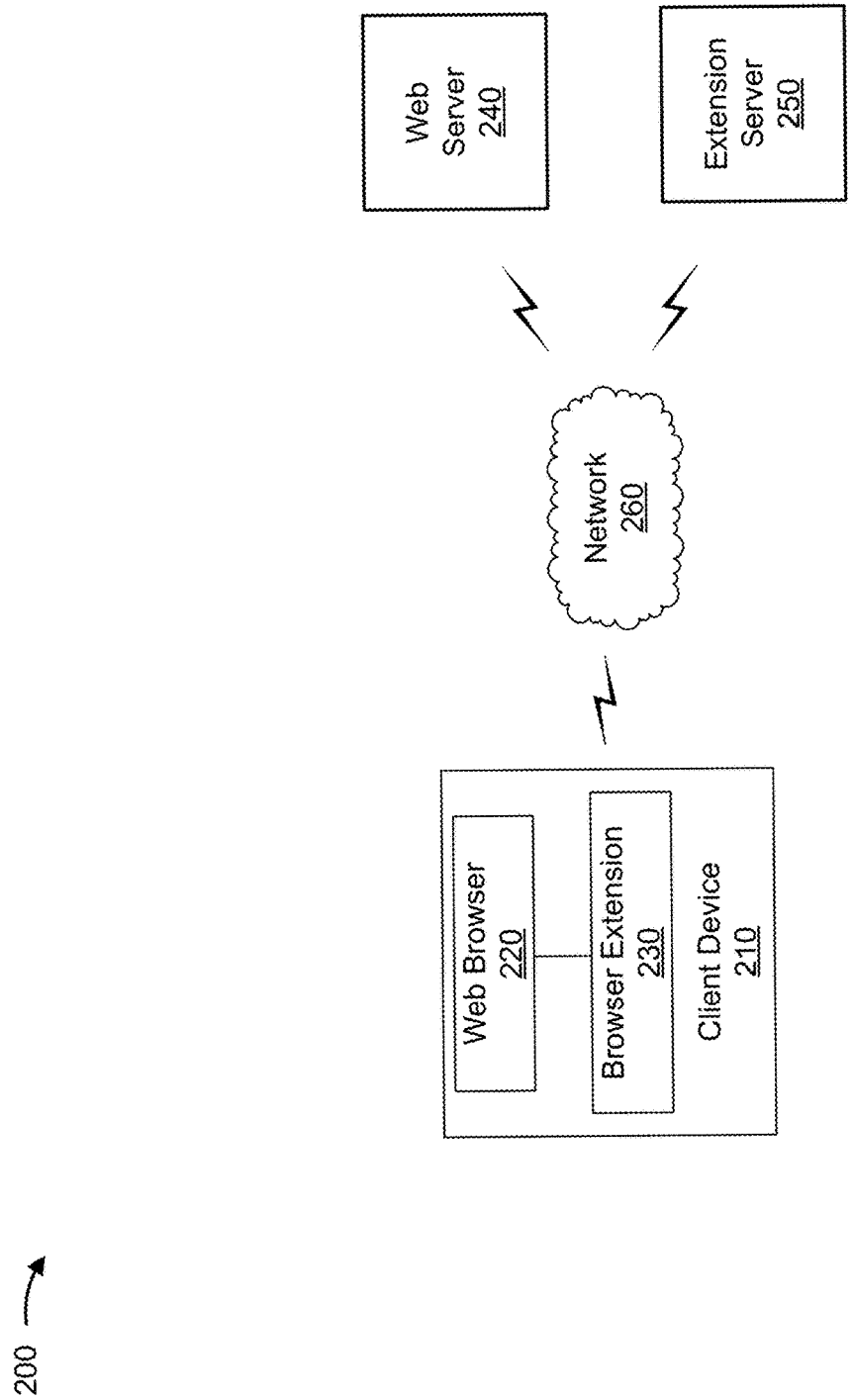
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210 (e.g., which may execute a web browser 220 and a browser extension 230), a web server 240, an extension server 250, and a network 260. Devices of environment 200 may interconnect via wired connections, wireless connections, or a combination of wired and wireless connections.

Client device 210 includes a device that supports web browsing. For example, client device 210 may include a computer (e.g., a desktop computer, a laptop computer, a tablet computer, a handheld computer, and/or the like), a mobile phone (e.g., a smart phone and/or the like), a television (e.g., a smart television), an interactive display screen, and/or a similar type of device. Client device 210 may host a web browser 220 and/or a browser extension 230 installed on and/or executing on the client device 210.

Web browser 220 includes an application, executing on client device 210, that supports web browsing. For example, web browser 220 may be used to access information on the World Wide Web, such as web pages, images, videos, and/or other web resources. Web browser 220 may access such web resources using a uniform resource identifier (URI), such as a uniform resource locator (URL), a uniform resource name (URN), and/or the like. Web browser 220 may enable client device 210 to retrieve and present, for display, content of a web page.

Browser extension 230 includes an application, executing on client device 210, capable of extending or enhancing functionality of web browser 220. For example, browser extension 230 may be a plug-in application for web browser 220. Browser extension 230 may be capable of executing one or more scripts (e.g., code, which may be written in a scripting language, such as JavaScript and/or the like) to perform an operation in association with the web browser 220.

Web server 240 includes a device capable of serving web content (e.g., web documents, HTML documents, web resources, images, style sheets, scripts, text, and/or the like). For example, web server 240 may include a server and/or computing resources of a server, which may be included in a data center, a cloud computing environment, and/or the like. Web server 240 may process incoming network requests (e.g., from client device 210) using HTTP and/or another protocol. Web server 240 may store, process, and/or deliver web pages to client device 210. In some implementations, communication between web server 240 and client device 210 may take place using HTTP.

Extension server 250 includes a device capable of communicating with client device 210 to support operations of browser extension 230. For example, extension server 250 may store and/or process information for use by browser extension 230. As an example, extension server 250 may store a list of domains applicable to a script to be executed by browser extension 230. In some implementations, client device 210 may obtain the list (e.g., periodically, based on a trigger, and/or the like), and may store a cached list locally on client device 210 for use by browser extension 230.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
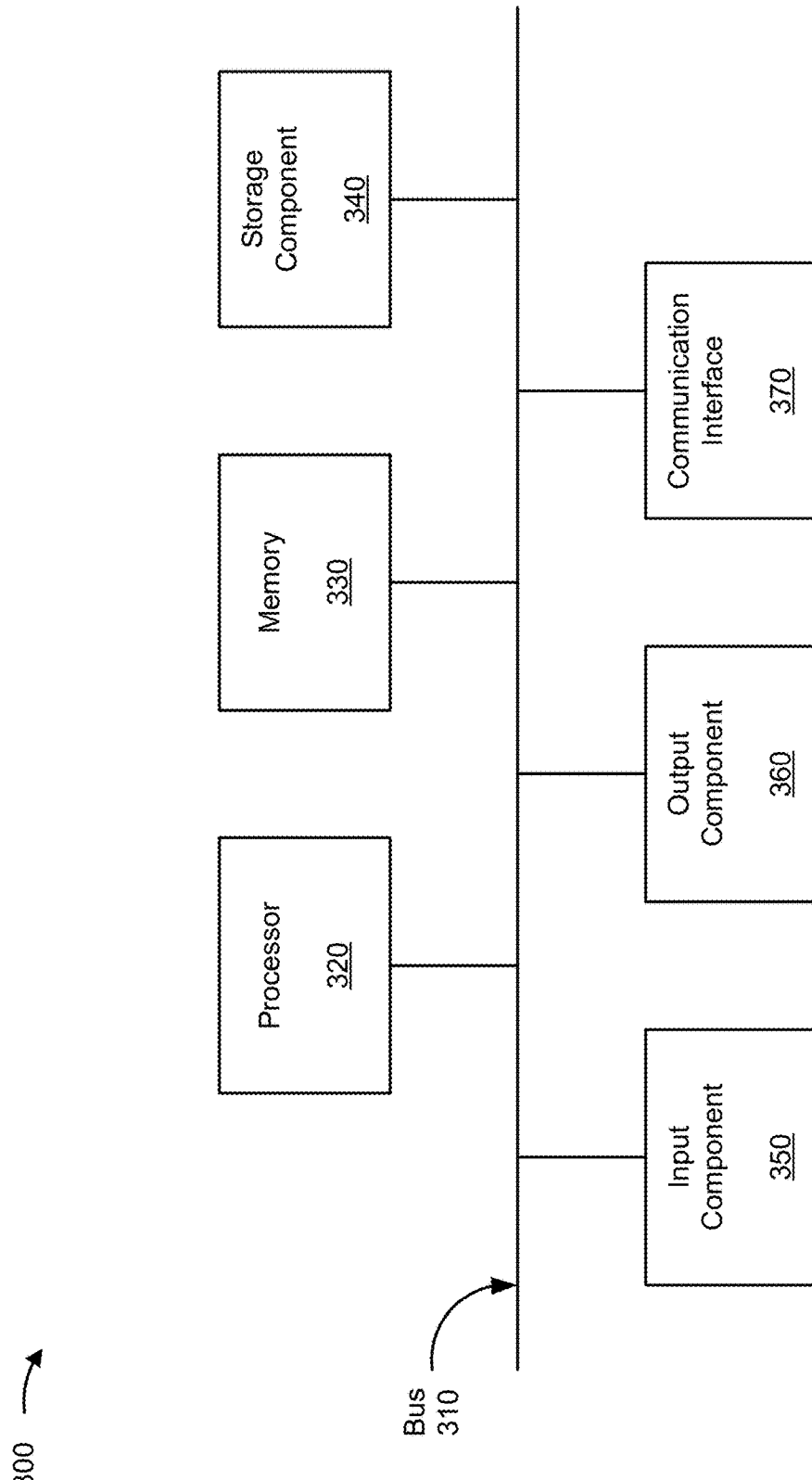
FIG. 3 is a diagram of example components of one or more devices of FIG. 2.

FIG. 3 is a diagram of example components of a device 300. Device 300 may correspond to client device 210, web server 240, extension server 250, and/or the like. In some implementations, client device 210, web server 240, and/or extension server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
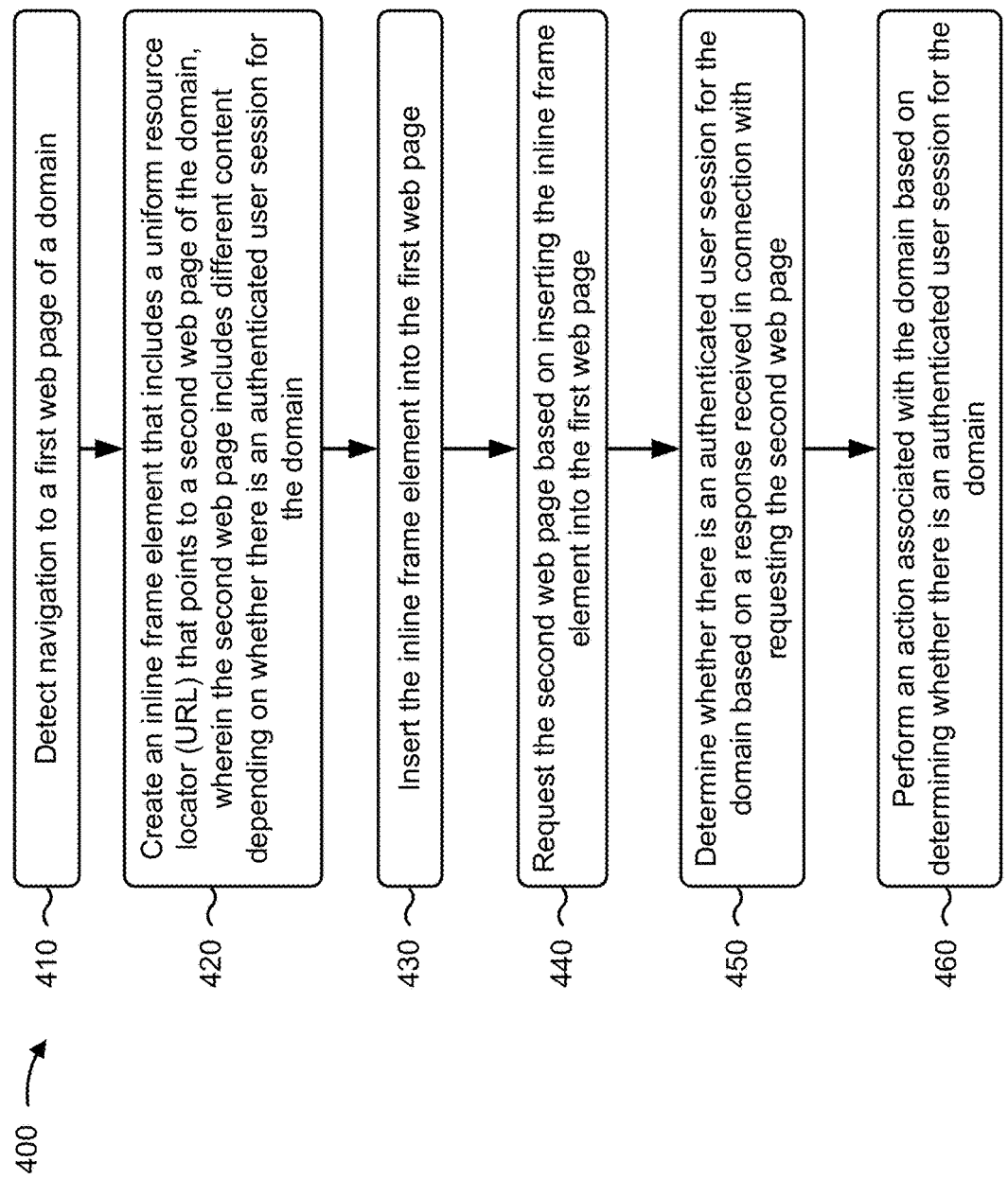

FIG. 4 is a flow chart of an example process 400 for determining whether an authenticated user session is active for a domain. In some implementations, one or more process blocks of FIG. 4 may be performed by a client device (e.g., client device 210 executing a browser extension 230). In some implementations, one or more process blocks of FIG. 4 may be performed by another device or a group of devices separate from or including the client device, such as web server 240, extension server 250, and/or the like.

As shown in FIG. 4, process 400 may include detecting navigation to a first web page of a domain (block 410). For example, the client device (e.g., using processor 320, memory 330, storage component 340, input component 350, output component 360, communication interface 370, and/or the like) may detect navigation to a first web page of a domain, as described above.

As further shown in FIG. 4, process 400 may include creating an inline frame element that includes a uniform resource locator (URL) that points to a second web page of the domain, wherein the second web page includes different content depending on whether there is an authenticated user session for the domain (block 420). For example, the client device (e.g., using processor 320, memory 330, storage component 340, input component 350, output component 360, communication interface 370, and/or the like) may create an inline frame element that includes a URL that points to a second web page of the domain, as described above. In some implementations, the second web page includes different content depending on whether there is an authenticated user session for the domain, as described above.

As further shown in FIG. 4, process 400 may include inserting the inline frame element into the first web page (block 430). For example, the client device (e.g., using processor 320, memory 330, storage component 340, input component 350, output component 360, communication interface 370, and/or the like) may insert the inline frame element into the first web page, as described above.

As further shown in FIG. 4, process 400 may include requesting the second web page based on inserting the inline frame element into the first web page (block 440). For example, the client device (e.g., using processor 320, memory 330, storage component 340, input component 350, output component 360, communication interface 370, and/or the like) may request the second web page based on inserting the inline frame element into the first web page, as described above.

As further shown in FIG. 4, process 400 may include determining whether there is an authenticated user session for the domain based on a response received in connection with requesting the second web page (block 450). For example, the client device (e.g., using processor 320, memory 330, storage component 340, input component 350, output component 360, communication interface 370, and/or the like) may determine whether there is an authenticated user session for the domain based on a response received in connection with requesting the second web page, as described above.

As further shown in FIG. 4, process 400 may include performing an action associated with the domain based on determining whether there is an authenticated user session for the domain (block 460). For example, the client device (e.g., using processor 320, memory 330, storage component 340, input component 350, output component 360, communication interface 370, and/or the like) may perform an action associated with the domain based on determining whether there is an authenticated user session for the domain, as described above.

Process 400 may include additional aspects, such as any single aspect or any combination of aspects described below and/or in connection with one or more other processes described elsewhere herein.

In some implementations, the inline frame element is hidden. In some implementations, the determination of whether there is an authenticated user session is based on a determination of whether a document, received in the response, satisfies a condition. In some implementations, the determination of whether there is an authenticated user session is based on a determination of whether specific content or a specific element is included in a document received in the response. In some implementations, determining whether there is an authenticated user session includes determining that there is an authenticated user session based on a determination that the second web page is received in the response, or determining that there is not an authenticated user session based on a determination that the second web page is not received in the response.

In some implementations, the action includes a first action to request user input to approve performance of a second action, wherein the second action is capable of being performed only if there is an authenticated user session for the domain. In some implementations, the second action includes generating a virtual card number to be used for a transaction associated with the domain.

Although FIG. 4 shows example blocks of process 400, in some implementations process 400 may include additional blocks, fewer blocks, different blocks, or differently arranged blocks than those depicted in FIG. 4. Additionally, or alternatively, two or more of the blocks of process 400 may be performed in parallel.

Figure 5:
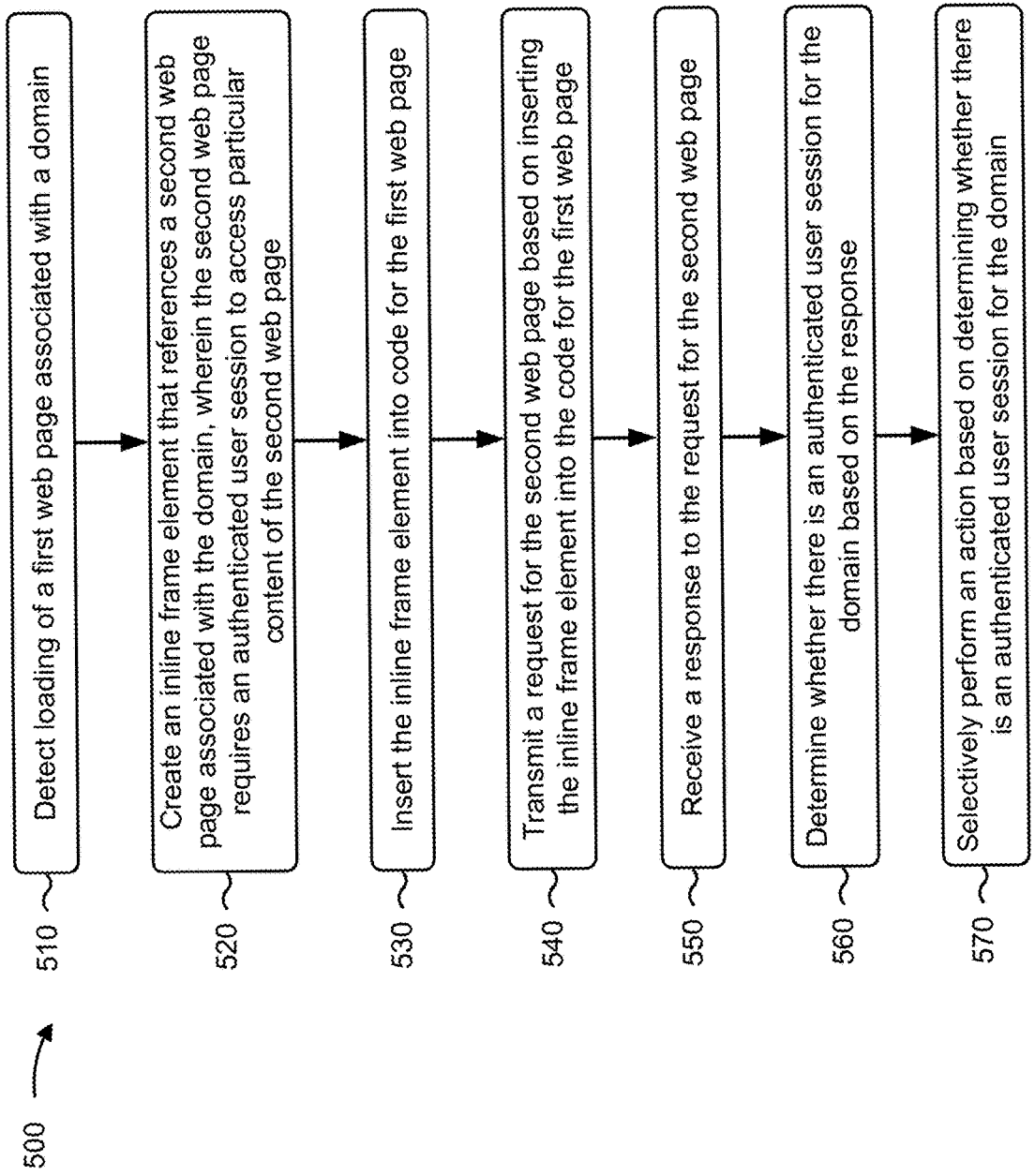

FIG. 5 is a flow chart of an example process 500 for determining whether an authenticated user session is active for a domain. In some implementations, one or more process blocks of FIG. 5 may be performed by a client device (e.g., client device 210 executing a browser extension 230). In some implementations, one or more process blocks of FIG. 5 may be performed by another device or a group of devices separate from or including the client device, such as web server 240, extension server 250, and/or the like.

As shown in FIG. 5, process 500 may include detecting loading of a first web page associated with a domain (block 510). For example, the client device (e.g., using processor 320, memory 330, storage component 340, input component 350, output component 360, communication interface 370, and/or the like) may detect loading of a first web page associated with a domain, as described above.

As further shown in FIG. 5, process 500 may include creating an inline frame element that references a second web page associated with the domain, wherein the second web page requires an authenticated user session to access particular content of the second web page (block 520). For example, the client device (e.g., using processor 320, memory 330, storage component 340, input component 350, output component 360, communication interface 370, and/or the like) may create an inline frame element that references a second web page associated with the domain, as described above. In some implementations, the second web page requires an authenticated user session to access particular content of the second web page.

As further shown in FIG. 5, process 500 may include inserting the inline frame element into code for the first web page (block 530). For example, the client device (e.g., using processor 320, memory 330, storage component 340, input component 350, output component 360, communication interface 370, and/or the like) may insert the inline frame element into code for the first web page, as described above.

As further shown in FIG. 5, process 500 may include transmitting a request for the second web page based on inserting the inline frame element into the code for the first web page (block 540). For example, the client device (e.g., using processor 320, memory 330, storage component 340, input component 350, output component 360, communication interface 370, and/or the like) may transmit a request for the second web page based on inserting the inline frame element into the code for the first web page, as described above.

As further shown in FIG. 5, process 500 may include receiving a response to the request for the second web page (block 550). For example, the client device (e.g., using processor 320, memory 330, storage component 340, input component 350, output component 360, communication interface 370, and/or the like) may receive a response to the request for the second web page, as described above.

As further shown in FIG. 5, process 500 may include determining whether there is an authenticated user session for the domain based on the response (block 560). For example, the client device (e.g., using processor 320, memory 330, storage component 340, input component 350, output component 360, communication interface 370, and/or the like) may determine whether there is an authenticated user session for the domain based on the response, as described above.

As further shown in FIG. 5, process 500 may include selectively performing an action based on determining whether there is an authenticated user session for the domain (block 570). For example, the client device (e.g., using processor 320, memory 330, storage component 340, input component 350, output component 360, communication interface 370, and/or the like) may selectively perform an action based on determining whether there is an authenticated user session for the domain, as described above.

Process 500 may include additional aspects, such as any single aspect or any combination of aspects described below and/or in connection with one or more other processes described elsewhere herein.

In some implementations, the determination of whether there is an authenticated user session is based on a determination of whether a document, received in the response, satisfies a condition. In some implementations, the condition is based on at least one of: a uniform resource locator of the document, a result of a query of the document for specific content, or a result of a query of the document for a specific type of element.

In some implementations, process 500 may include creating the inline frame element based on a determination that the domain satisfies one or more conditions. In some implementations, the one or more conditions include the domain being included in a list of domains stored in the memory of the device or a server in communication with the device.

In some implementations, the request indicates a user agent for the inline frame element, wherein the user agent for the inline frame element is the same for different requests associated with different web browsers, different operating systems, or different devices. In some implementations, a first user agent, indicated in a request for the first web page, is different from a second user agent indicated in the request for the second web page.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for determining whether an authenticated user session is active for a domain. In some implementations, one or more process blocks of FIG. 6 may be performed by a client device (e.g., client device 210 executing a browser extension 230). In some implementations, one or more process blocks of FIG. 6 may be performed by another device or a group of devices separate from or including the client device, such as web server 240, extension server 250, and/or the like.

As shown in FIG. 6, process 600 may include detecting access to a first web page of a domain (block 610). For example, the client device (e.g., using processor 320, memory 330, storage component 340, input component 350, output component 360, communication interface 370, and/or the like) may detect access to a first web page of a domain, as described above.

As further shown in FIG. 6, process 600 may include creating an inline frame element to be used to request a second web page of the domain, wherein the second web page or some content of the second web page is inaccessible unless an authenticated user session is active for the domain (block 620). For example, the client device (e.g., using processor 320, memory 330, storage component 340, input component 350, output component 360, communication interface 370, and/or the like) may create an inline frame element to be used to request a second web page of the domain, as described above. In some implementations, the second web page or some content of the second web page is inaccessible unless an authenticated user session is active for the domain.

As further shown in FIG. 6, process 600 may include inserting the inline frame element into the first web page (block 630). For example, the client device (e.g., using processor 320, memory 330, storage component 340, input component 350, output component 360, communication interface 370, and/or the like) may insert the inline frame element into the first web page, as described above.

As further shown in FIG. 6, process 600 may include transmitting a request for the second web page based on inserting the inline frame element into the first web page (block 640). For example, the client device (e.g., using processor 320, memory 330, storage component 340, input component 350, output component 360, communication interface 370, and/or the like) may transmit a request for the second web page based on inserting the inline frame element into the first web page, as described above.

As further shown in FIG. 6, process 600 may include determining whether an authenticated user session is active for the domain based on a response to the request for the second web page (block 650). For example, the client device (e.g., using processor 320, memory 330, storage component 340, input component 350, output component 360, communication interface 370, and/or the like) may determine whether an authenticated user session is active for the domain based on a response to the request for the second web page, as described above.

As further shown in FIG. 6, process 600 may include selectively performing an action associated with the domain based on determining whether an authenticated user session is active for the domain (block 660). For example, the client device (e.g., using processor 320, memory 330, storage component 340, input component 350, output component 360, communication interface 370, and/or the like) may selectively perform an action associated with the domain based on determining whether an authenticated user session is active for the domain, as described above.

Process 600 may include additional aspects, such as any single aspect or any combination of aspects described below and/or in connection with one or more other processes described elsewhere herein.

In some implementations, the inline frame element is a hidden inline frame element. In some implementations, the determination of whether an authenticated user session is active is based on at least one of: a uniform resource locator of a document received in the response, or a result of a query of the document for information indicative of whether an authenticated user session is active for the domain. In some implementations, the action is associated with generating a virtual card number to be used for a transaction associated with the domain.

In some implementations, process 600 may include determining that the response includes code to deny rendering of the second web page in the inline frame element, modifying the code to permit rendering of the second web page in the inline frame element, and rendering the second web page after modifying the code. In some implementations, process 600 may include refraining from modifying code, in one or more responses, to deny rendering in one or more inline frame elements on the first web page after rendering the second web page in the inline frame element or determining whether there is an authenticated user session.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    detecting, by a device, a first web page of a domain;
    determining, by the device, that the domain is identified, in a list of domains, as an applicable domain;
    requesting, by the device and based on determining that the domain is identified, in the list of domains, as the applicable domain, a second web page associated with the domain;
    receiving, by the device and based on requesting the second web page, response data;
    determining, by the device, whether the response data satisfies a condition,
        wherein determining whether the response data satisfies the condition comprises:
            determining whether there is an authenticated user session with the domain; and
    performing, by the device, an action associated with the domain based on determining whether the response data satisfies the condition.

2. The method of claim 1, wherein determining whether the response data satisfies the condition further comprises:
    determining, using a browser extension operating on the device, whether the response data satisfies the condition.

3. The method of claim 1, wherein determining whether the response data satisfies the condition further comprises:
    searching the response data for at least one of:
        particular text,
        particular code,
        a particular web page element,
        a particular type of web page element, or
        a particular tag associated with the response data; and
    determining whether the response data satisfies the condition based on a result of searching the response data.

4. The method of claim 1, wherein determining whether the response data satisfies the condition further comprises:
    comparing the response data to an expected response; and
    determining whether the response data satisfies the condition based on a result of comparing the response data to the expected response.

5. The method of claim 1, wherein performing the action comprises:
    performing a first action based on the response data satisfying the condition; and
    performing a second action, different from the first action, based on the response data not satisfying the condition.

6. The method of claim 1, further comprising:
    periodically obtaining, from an extension server, update data for updating the list of domains.

7. The method of claim 1, wherein the response data includes:
    data defining the second web page, and
    data indicating whether there is the authenticated user session with the domain.

8. A device, comprising:
    one or more memories; and
    one or more processors communicatively coupled to the one or more memories, configured to:
        detect a first web page of a domain;
        determine that the domain is identified, in a list of domains, as an applicable domain;
        request, based on determining that the domain is identified, in the list of domains, as the applicable domain, a second web page associated with the domain;
        receive, based on requesting the second web page, response data;
        determine whether the response data satisfies a condition;
            wherein the one or more processors, when determining whether the response data satisfies the condition, are configured to:
                determine whether there is an authenticated user session with the domain; and
        perform an action associated with the domain based on determining whether the response data satisfies the condition.

9. The device of claim 8, wherein the one or more processors, when determining whether the response data satisfies the condition, are configured to:
    determine, using a browser extension operating on the device, whether the response data satisfies the condition.

10. The device of claim 8, wherein the one or more processors, when determining whether the response data satisfies the condition, are configured to:
    search the response data for at least one of:
        particular text,
        particular code,
        a particular web page element,
        a particular type of web page element, or
        a particular tag associated with the response data; and determine whether the response data satisfies the condition based on a result of searching the response data.

11. The device of claim 8, wherein the one or more processors, when determining whether the response data satisfies the condition, are configured to:
    compare the response data to an expected response; and
    determine whether the response data satisfies the condition based on a result of comparing the response data to the expected response.

12. The device of claim 8, wherein the one or more processors, when performing the action, are configured to:
    perform a first action based on the response data satisfying the condition; and
    perform a second action, different from the first action, based on the response data not satisfying the condition.

13. The device of claim 8, wherein the one or more processors are further configured to:
    periodically obtain, from an extension server, update data for updating the list of domains.

14. The device of claim 8, wherein the response data includes:
    data defining the second web page, and
    data indicating whether there is the authenticated user session with the domain.

15. A non-transitory computer-readable medium storing instructions, the instructions comprising:
    one or more instructions that, when executed by one or more processors of a device, cause the one or more processors to:
    detect a first web page of a domain;
    determine that the domain is identified, in a list of domains, as an applicable domain;
    request, based on determining that the domain is identified, in the list of domains, as the applicable domain, a second web page associated with the domain;
    receive, based on requesting the second web page, response data;
    determine whether the response data satisfies a condition;
        wherein the one or more instructions, that cause the one or more processors to determine whether the response data satisfies the condition, cause the one or more processors to:
            determine whether there is an authenticated user session with the domain; and
        perform an action associated with the domain based on determining whether the response data satisfies the condition.

16. The non-transitory computer-readable medium of claim 15, wherein the one or more instructions, that cause the one or more processors to determine whether the response data satisfies the condition, cause the one or more processors to:
    determine, using a browser extension operating on the device, whether the response data satisfies the condition.

17. The non-transitory computer-readable medium of claim 15, wherein the one or more instructions, that cause the one or more processors to determine whether the response data satisfies the condition, cause the one or more processors to:
    search the response data for at least one of:
        particular text,
        particular code,
        a particular web page element,
        a particular type of web page element, or
        a particular tag associated with the response data; and
    determine whether the response data satisfies the condition based on a result of searching the response data.

18. The non-transitory computer-readable medium of claim 15, wherein the one or more instructions, that cause the one or more processors to determine whether the response data satisfies the condition, cause the one or more processors to:
    compare the response data to an expected response; and
    determine whether the response data satisfies the condition based on a result of comparing the response data to the expected response.

19. The non-transitory computer-readable medium of claim 15, wherein the one or more instructions, that cause the one or more processors to perform the action, cause the one or more processors to:
    perform a first action based on the response data satisfying the condition; and
    perform a second action, different from the first action, based on the response data not satisfying the condition.

20. The non-transitory computer-readable medium of claim 15, wherein the one or more instructions, when executed by the one or more processors, further cause the one or more processors to:
    periodically obtain, from an extension server, update data for updating the list of domains.

* * * * *